United States Patent
Yuan et al.

(10) Patent No.: US 12,039,418 B2
(45) Date of Patent: Jul. 16, 2024

(54) INCREMENTAL LEARNING THROUGH REVERSE DATA DISTRIBUTION

(71) Applicant: International Business Machines Corporation, Armonk, NY (US)

(72) Inventors: Zhong Fang Yuan, Xi'an (CN); Tong Liu, Xi'an (CN); Li Ni Zhang, Beijing (CN); Bin Shang, Xi'an (CN); Yong Fang Liang, Beijing (CN); Chen Gao, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 508 days.

(21) Appl. No.: 16/939,621

(22) Filed: Jul. 27, 2020

(65) Prior Publication Data
US 2022/0027784 A1    Jan. 27, 2022

(51) Int. Cl.
*G06N 20/00* (2019.01)
*G06N 3/02* (2006.01)
(Continued)

(52) U.S. Cl.
CPC ............... *G06N 20/00* (2019.01); *G06N 3/02* (2013.01); *G06N 3/08* (2013.01); *G06N 3/088* (2013.01)

(58) Field of Classification Search
CPC ............ G06N 20/00; G06N 3/02; G06N 3/08; G06N 3/088
See application file for complete search history.

(56) References Cited

U.S. PATENT DOCUMENTS 8,862,522 B1    10/2014    Jaiswal et al.
10,049,128 B1 *  8/2018    Zhang .................... G16C 20/30
(Continued)

FOREIGN PATENT DOCUMENTS

WO    2019193462 A1    10/2019

OTHER PUBLICATIONS

Henriques et al., "Data-driven reverse engineering of signaling pathways using ensembles of dynamic models," PLOS Computational Biology, Feb. 6, 2017, 25 pages, DOI:10.1371/journal.pcbi.1005379.
(Continued)

*Primary Examiner* — Roberto Borja
(74) *Attorney, Agent, or Firm* — Peter J. Edwards

(57) ABSTRACT

A method, system, and computer program product for reconstructing training data and building a new incremental learning model with the reconstructed training data that can be further trained. The method may include receiving new data to be inputted into a previously trained machine learning model, where the previously trained machine learning model has inaccessible training data. The method may also include generating simulated training data using a reverse form of the previously trained machine learning model. The method may also include verifying the simulated training data. The method may also include creating a new machine learning model using the simulated training data, where the new machine learning model includes a same structure as the previously trained machine learning model. The method may also include inputting the new data into the new machine learning model, where the new machine learning model is further trained with the new data.

20 Claims, 4 Drawing Sheets

(51) Int. Cl.
*G06N 3/08* (2023.01)
*G06N 3/088* (2023.01)

(56) References Cited

U.S. PATENT DOCUMENTS

| | | | |
|---|---|---|---|
| 2018/0314981 A1* | 11/2018 | Chen | G06F 9/5072 |
| 2019/0156215 A1 | 5/2019 | Matveev et al. | |
| 2020/0065221 A1 | 2/2020 | Truong et al. | |
| 2020/0342362 A1* | 10/2020 | Soni | G16H 10/00 |
| 2020/0356905 A1* | 11/2020 | Luk | G06N 3/0454 |
| 2020/0364562 A1* | 11/2020 | Khoreva | G06N 3/08 |
| 2021/0012862 A1* | 1/2021 | Plumbley | G06N 20/00 |
| 2022/0004900 A1* | 1/2022 | Salahuddin | G06F 30/27 |

OTHER PUBLICATIONS

Sheriffdeen et al., "Accelerating PDE-Constrained Inverse Solutions With Deep Learning and Reduced Order Models," Dec. 20, 2019, 15 pages.

\* cited by examiner

INCREMENTAL LEARNING THROUGH REVERSE DATA DISTRIBUTION

BACKGROUND

The present disclosure relates to incremental machine learning and, more specifically, to reconstructing training data and building a new incremental learning model using the reconstructed training data that can be further trained.

Machine learning models are typically built and trained using training data. In some instances, the machine learning model may be fully built and trained using the training data. However, in some instances, not all the necessary data is available when building and training the model or, even if the necessary data is available, the model may be further fine-tuned (and further trained) using future data. These types of instances may utilize incremental machine learning, which may continuously use new/future input data to further train the model. In incremental machine learning, the model may always be changing and evolving based on the new input data.

SUMMARY

The present invention provides a computer-implemented method, system, and computer program product to reconstruct training data and build a new incremental learning model using the reconstructed training data that can be further trained. The method may include receiving new data to be inputted into a previously trained machine learning model, where the previously trained machine learning model has inaccessible training data. The method may also include generating simulated training data using a reverse form of the previously trained machine learning model. The method may also include verifying the simulated training data. The method may also include creating a new machine learning model using the simulated training data, where the new machine learning model includes a same structure as the previously trained machine learning model. The method may also include inputting the new data into the new machine learning model, where the new machine learning model is further trained with the new data. The system and computer program product may include similar steps.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
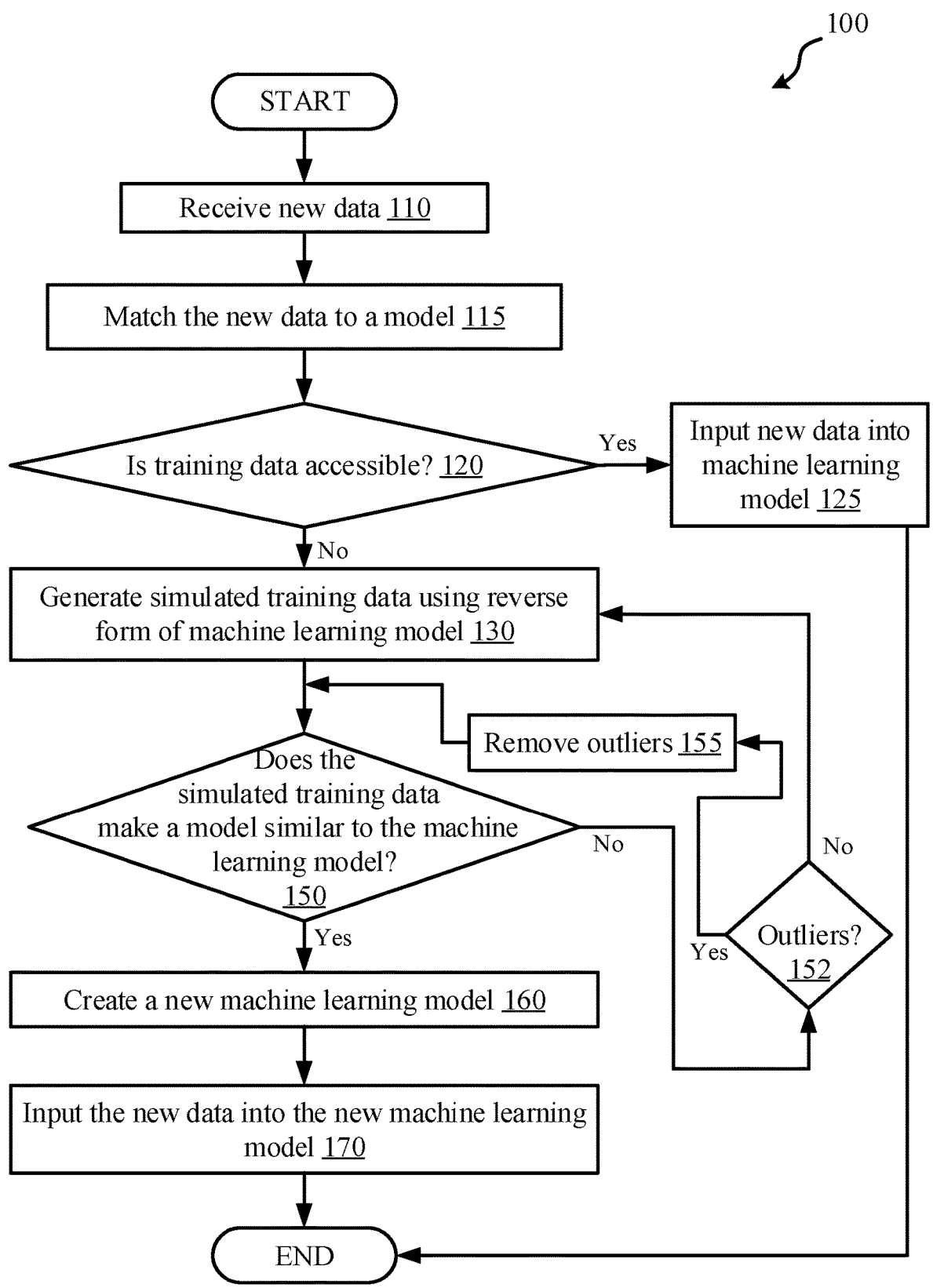
FIG. 1 depicts a flowchart of a set of operations for reconstructing training data and a new machine learning model based on the training data, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to incremental machine learning and, more specifically, to reconstructing training data and building a new incremental learning model using the reconstructed training data that can be further trained. While the present disclosure is not necessarily limited to such applications, various aspects of the disclosure may be appreciated through a discussion of various examples using this context.

As discussed herein, incremental machine learning may continuously use new input data to further train a machine learning model. The model may be continuously changing and evolving based on the new inputs that further train the machine learning model. However, in order to train the machine learning model, the old training data that has been used to build and train the model may still be utilized for current and/or future training. In incremental learning, the machine learning algorithm may adapt or adjust to the new training data while still using the knowledge gained from the old training data. The model may be further trained by the new training data, not retrained.

In some instances, especially with the continuous growing and evolving of technology, the old data may no longer be accessible. For example, the data may have been lost or deleted, for instance due to a system crash, a user error, etc. In another example, the data may no longer be accessible, for instance due to new system encryptions, system accessibility policies, etc. In instances where the old data is no longer accessible, the machine learning may not have the ability to be further trained through incremental learning, due to the loss in old data. As discussed above, incremental learning may further train a model, instead of retraining a model. In order to further train a model, the training data that was previously used to train the model may be necessary. Put differently, the algorithm may need its existing knowledge (through the past training data) about the model in order to further train it. Further, without the training data used to train the model, only a static machine learning model (without any knowledge/information of how the model was trained to its current state) may be accessible.

For example, if a machine learning model was created to predict the weather for Chicago, Illinois, various training data about the weather in Chicago at different times of year and throughout different years may be used to build and train the model. In this example, the next year in Chicago may have a warmer February than usual (e.g., with temperatures 32 degrees Fahrenheit and above) and that weather data may be used to further train the model. However, in this example, if the machine learning algorithm no longer had any access to the initial training data, the new data may have an inordinately large effect on the model during retraining, leading to a retrained model that may predict far warmer weather in February than most historical data would suggest. This may then make the model inaccurate in a February with average temperatures, and particularly inaccurate in a February that is colder than usual (e.g., with temperatures below 0 degrees Fahrenheit).

If, however, the training data was still accessible, the machine learning algorithm may have had a variety of data about cold fronts, warm fronts, wind speeds, snowfall, etc. that could have been used to more accurately analyze the warmer February data and adjust the model accordingly. For instance, the old training data may include data about warmer winter temperatures due to a weather pattern of Arctic Oscillation that trapped cold air near the north pole instead of it spreading south to the United States. If this data was accessible, the machine learning model could be further trained on Arctic Oscillation with the new February weather data, and may become more accurate on predicting Arctic Oscillations.

In conventional machine learning, when old training data is no longer available for an incremental machine learning algorithm, transfer learning may be used to apply the old machine learning model (built and trained using the old data) to the new data (for example, by inputting the new data into the old machine learning model). However, for incremental machine learning, when the model is further trained by new training data, simply inputting data into the pre-existing model does not further train the model. Transfer learning may use knowledge gained from one task (in this instance, the trained machine learning algorithm) and may use that knowledge to solve a related task (in this instance, new training data). Using transfer learning, the new training data (for example, from new input data) may be added to the old model to fine-tune the model. However, any knowledge or information gained from the old data may be lost (as the old training data is no longer accessible), and the old machine learning model may be used as a static starting point, or a starting point without any information about how it was formed, for the new data and model. This may reduce the performance, effectiveness, and accuracy of the fine-tuned model, because all the training knowledge from the old data was lost and there is no information about how the model was formed.

The present disclosure provides a computer-implemented method, system, and computer program product to reconstruct training data and build a new incremental learning model (using the reconstructed training data) that can be further trained. In some embodiments, the old, inaccessible data may be deduced through a reverse simulation method, reversing the old machine learning model and simulating a version of the old data using the reverse model. In some instances, a distribution function (such as a softmax function) may be used to create a probability distribution of the old machine learning model. The probability distribution (in vector form) may be inputted into the reverse machine learning model in order to determine the simulated old data. The simulated old data may then be used to construct and train a new (forward) machine learning model. Any new data inputted into the new machine learning model may further train the new model, and the overall training of the new model may include both the simulated old data and any new data received. This may increase the performance, accuracy, and/or effectiveness of the new machine learning model, as it has been trained by both the simulated old data and the new data, and also has the training knowledge from both the (simulated) old data and the new data.

Referring now to FIG. 1, a flowchart illustrating a method 100 for reconstructing training data and a new machine learning model based on the training data is depicted, according to some embodiments. In some embodiments, method 100 is executed by a server (e.g., computer system/server 402 (FIG. 4)) on or connected to a computer system (e.g., incremental learning system 200 (FIG. 2) and/or computer system 400 (FIG. 4)). In some embodiments, the method 100 is implemented as a computer script or computer program (e.g., computer executable code) to be executed on or connected to the computer system.

Method 100 includes operation 110 to receive new data. The new data may be data that is to be inputted as training data into a previously trained machine learning model. For instance, as discussed herein, incremental learning may be used to continuously train a machine learning model. Therefore, for incremental learning models, additional training data may be inputted into the model. In some embodiments, a client, user, etc. may input the data.

In some embodiments, method 100 includes operation 115 to match the new data to a machine learning model. To match the data to a machine learning model, the intended output, a category of the data, or both, may be determined. For example, the input may include information about a healthcare patient and the intended output may be any concerns and/or trends in the patient's health. In this example, the intended output of concerns/trends in the patient's health, a category of healthcare, and any other information may be analyzed in order to match the data to a machine learning model capable of identifying trends/concerns in health for a healthcare patient. In another example, the input data may include various information about players on a basketball team and the intended output may be to predict how many wins the basketball team may have this season. In this example, the intended output of predicted wins, a category of the data such as sports and/or basketball, and other information may be analyzed in order to match the data to a machine learning model capable of predicting wins for a basketball team.

Method 100 includes operation 120 to determine whether the training data for a previously trained machine learning model is accessible. Once the machine learning model that should be used for the specific input data is identified/selected, whether any training data that was previously used to train the model is still accessible can be determined. If the old training data in inaccessible, then the model may not be able to be further trained with the new data (for example, through incremental machine learning) and/or it may be impossible to combine the new inputted data with the old data (as it is inaccessible) to more completely and accurately train the model. In some embodiments, whether the training data is still accessible may be determined by attempting to access (for example, by requesting) the training data.

If the training data is still accessible, method 100 may proceed to operation 125 and may input the new data (received in operation 110) as training data into the old machine learning model, and may further train the model (for instance, using incremental learning) using the new data. In this instance, the original training data for the old model is still accessible, so the new training data may be added and used as training data along with the old training data in order to further train the old model. The data may be inputted and used to train the old model using conventional methods, in some embodiments. In these instances, as the old (or original) machine learning model may be further trained and used without issue (for example, as the training data is still accessible and may be combined with the new data for further training), method 100 may end after operation 125.

If the training data is not accessible, in operation 120, method 100 may proceed to operation 130 to generate simulated training data using a reverse form of the previously trained machine learning model. When the training data is not accessible, a new version of the training data may be deduced or simulated in order to allow the machine learning model to be further trained (for example, by adding new training data to the simulated training data). In some embodiments, a reverse form of the previously trained machine learning model may be used. For example, using a very simple (non-machine learning) model y=mx+b, the reverse form of the model may be x=(y−b)/m. This example is a very simple example, and a reverse form of a machine learning model may be much more complex.

In some embodiments, generating the simulated training data using the reverse form of the previously trained machine learning model includes generating a plurality of probability vectors for the previously trained machine learning model. The generated probability vectors may be used as inputs for the reverse machine learning model. In some embodiments, a softmax distribution model (or softmax regression) may be used to generate the probability vectors. The softmax model may take data from the old machine learning model (or the previously trained machine learning model) and may generate a plurality of probability vectors for the old model. Each probability vector may add up to one. For example, a probability vector may be [0.55, 0.35, 0.1] with the probabilities included in the vector adding up to one. In some embodiments, a large amount of probability vectors may be generated in this step.

In some embodiments, generating the simulated training data using the reverse form of the previously trained machine learning model further includes removing parameters of the previously trained machine learning model. As discussed herein, a reverse form of the previously trained machine learning may be used. In some embodiments, to help generate the reverse machine learning model, the various parameters may be removed from the original, or the previously trained machine learning model. Model parameters may be parameters that were learned from the training data (that is now inaccessible) from the original model. For example, a model parameter may be a specific coefficient (e.g., regression coefficient) for the previously trained machine learning model.

In some embodiments, generating the simulated training data using the reverse form of the previously trained machine learning model includes transposing operators of the previously trained machine learning model to form a reverse machine learning model. For example, for a matrix, transposing the operator may include finding the inverse matrix. In a more specific example, in matrix multiplication, the multiplication of a matrix may be transposed (i.e., reversed) to the multiplication of the inverse matrix. In instances of addition and subtraction, the addition may be transposed to subtraction, and vice versa. In some embodiments, the reverse form of the previously trained machine learning model may be the model after the operators have been transposed.

In some embodiments, generating the simulated training data using the reverse form of the previously trained machine learning model includes inputting the plurality of the probability vectors into the reverse machine learning model. Each probability vector input may generate a simulated data output, in some instances. Because there may be a large amount of probability vectors, a large amount of simulated data outputs may be generated and may make up the new set of simulated training data. In some instances, vectors are used to represent various data/features within a machine learning model. Embedded layers may be used to keep each vector size smaller (for example, by referencing vectors within other vectors). When embedded layers are used, in some instances, the output of the reverse machine learning model may be a vector that is equal to a size of an embedded layer (for example, an embedded vector) of the previously trained machine learning model. This way, the vector sizes may be smaller than if there were no embedded vectors and embedded layers. Further, for the new simulated training data to be consistent with the original model, each simulated data vector may be equal in size with an embedded layer of the original (previously trained) model.

In some embodiments, each probability vector input corresponds to a simulated data output vector. Put differently, one probability vector may produce one simulated data output vector. If multiple probability vectors are inputted into the reverse machine learning model, multiple simulated data output vectors may be outputted. The plurality of simulated data outputs that are generated (from the plurality of probability vectors) may make up the simulated training data. Put differently, the simulated training data may include the simulated data outputs for each of the probability vectors.

Method 100 includes operation 150 to determine whether the simulated training data makes a model similar to the machine learning model. In some embodiments, determining whether the simulated training data makes a model similar to the machine learning model may be referred to as verifying the simulated training data. Put differently, in some instances, verifying the simulated training data includes determining whether the simulated training data can train a model similar to the old model. Once the simulated training data is generated, it may need to be verified with the original model. If the simulated training data is not consistent with the original (previously trained) model, then using the simulated training data to create and train a new model may end up creating a model that is not consistent with the old model. In some embodiments, the old (previously trained) model and a model trained by the simulated training data may be consistent with each other when a vector distribution of the simulated training data is consistent with a vector distribution of the inaccessible training data.

In some embodiments, determining whether the simulated training data makes a model similar to the machine learning model (and verifying the simulated training data) includes constructing a forward machine learning model from the simulated training data. The simulated training data may be used as training data to build and train a new forward (i.e., not reverse) machine learning model. Once the forward machine learning model has been created, it may be compared to the previously trained machine learning model, in some embodiments. Comparing the machine learning models may include identifying any similarities and differences between the forward machine learning model and the previously trained machine learning model. In some embodiments, a similarity factor indicating how similar the two models are may be determined based on the comparison. For example, it may be determined that the old model and the new forward model are 95% similar. In some embodiments, the similarity factor may be a percent, a decimal, a natural language category, etc. Using the previous example of a 95% similarity factor, this same factor may be expressed as 0.5, 95 out of 100, substantially similar, etc.

In some embodiments, determining whether the simulated training data makes a model similar to the machine learning model further includes determining, based on the comparing, whether the forward machine learning model meets a similarity threshold to the previously trained machine learning model. In some embodiments, the similarity threshold may be a similarity factor value (or range of values) that the determined similarity factor should be above (or equal to). For example, the similarity threshold may be 90%, 0.90-0.95, etc. Using the above example of a 95% similarity factor, the 95% similarity between the two models may be above and/or equal to the similarity threshold. Therefore, in this example, the new forward model may meet (or exceed) a similarity threshold when compared to the previously trained machine learning model.

In some embodiments, the forward machine learning model may not be consistent with the previously trained model. In some instances, this may be due to poor simulated training data all together. However, in some instances, the simulated training may simply have some outliers that can be removed. Therefore, in some embodiments, after comparing the forward machine learning model to the previously trained machine learning model, the simulated training data may be analyzed to determine whether there are any outliers (operation 152). If any outliers are identified, the outliers may be removed from the simulated training data set (operation 155). Once the outliers are removed, the method may return to operation 150 to determine whether the updated simulated training data (without the outliers) is verified with the original model by generating an updated forward machine learning model. This updated forward model may be compared with the previously trained model. In some instances, by removing the outlier training data, the updated forward model may be found consistent with the old (previously trained) model.

If it is determined that the simulated training data does not make a model similar to the machine learning model (for instance, indicating that the simulated training data is not verified against the original model) and that there are no outliers in the simulated training data (in operation 152), method 100 may return back to operation 130 to generate new simulated training data. If the model is not verified against the original model and the simulated training data has no outliers, then the simulated training data may be bad (or inaccurate) data. When returning back to operation 130, in some embodiments, new probability vectors (as there may be large quantities of possible probability vectors) may be used with the reverse machine learning model to try and generate improved simulated training data. In some embodiments, method 100 may return back to operation 130 if the forward machine learning model does not meet the similarity threshold when compared to the previously trained model. In some instances (as depicted in FIG. 1), method 100 may not return back to operation 130 to generate new simulated training data until after any outliers are removed (in operation 155), the simulated data with the outliers removed is determined to not make a model similar to the machine learning model, in operation 150, (for instance, by not meeting the similarity threshold), and it is determined that there are no additional outliers (in operation 152).

If it is determined, in operation 150, that the simulated training data does make a model similar to the machine learning model, method 100 may proceed to operation 160 to create a new machine learning model using the simulated training data. In some instances, creating the new machine learning model includes selecting the forward machine learning model as the new machine learning model. The forward machine learning model may have been created and verified (in operation 150) and may be selected as the new model in operation 160. In some instances, the forward machine learning model may be the preliminary new machine learning model, and the machine learning model may be recreated in operation 160. In some embodiments not disclosed in FIG. 1, method 100 may proceed from operation 130 to 160, and the new machine learning model may be created (using a same/similar method used to create the forward model, above) in operation 160. In some embodiments, the new machine learning model has a same structure as the previously trained machine learning model. In some embodiments, the new machine learning model has a similar structure as the previously trained machine learning model. The simulated training data (generated in operation 130) may be used as training data to build and train the new machine learning model. In some embodiments, the simulated training data after the outliers have been removed (in operation 155) may be used to build and train the new machine learning model.

Method 100 includes operation 170 to input the new data (received in operation 110) into the new machine learning model as training data. As discussed herein, machine learning models may be continuously trained with new data (for example, for incremental learning). Therefore, in some embodiments, the new machine learning model is further trained with the new data once it is inputted into the new machine learning model. The new data (received in operation 110) may be inputted as training data into the new machine learning model after the new machine learning model was created, in some instances. In some embodiments, inputting the new data into the new machine learning model may be in response to verifying the simulated training data (in operation 140). If the simulated training data is not verified, it may not be used to generate a new model and/or the new machine learning model may not be used for any new data, in some instances. In some instances, the new data is also inputted into the new machine learning model in order to determine an output to transmit back to a client, etc.

Inputting the new data into the new machine learning model may include mixing the new data with the simulated training data to form new training data. By mixing the data into one new training dataset, the model may be trained using the data as a whole and may more accurately train/update the model, in some instances. In some embodiments, the new training data may train the new machine learning model in one batch (instead of multiple batches). In some embodiments, creating the new machine learning model and inputting the new data into the new machine learning model (i.e., operations 160 and 170, respectively) are executed in one batch. Although operations 160 and 170 are depicted as separate operations in FIG. 1, these operations may be combined to form a single creating/training operation that is done in one training batch. For instance, the new training data may be combined with the simulated training data and then the new machine learning model may be built and trained with the combined training dataset. In some instances, operations 160 and 170 may be done in multiple batches. For instance, the simulated training data may be used to build and train the new machine learning model in one batch, and then the new data may be inputted to further train the new machine learning model in a second batch. If operations 160 and 170 are combined to form a single creating/training operation that is done in one training batch, the forward model that was created to perform operation 150 may be used as a preliminary model, and then the simulated training data used to create the forward model may be combined with the new data before officially creating the new machine learning model, in some instances.

Figure 2:
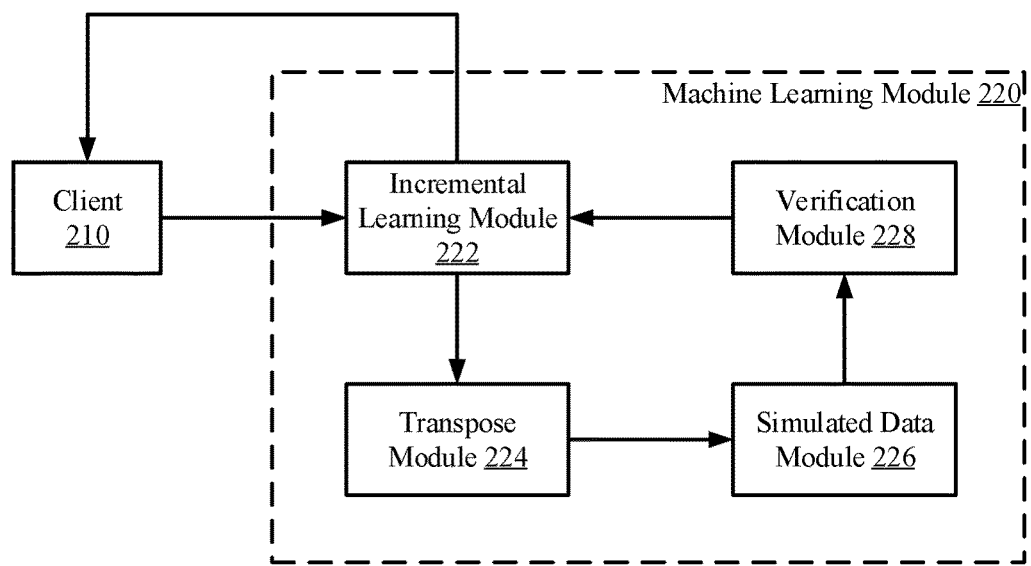
FIG. 2 depicts a block diagram of an example incremental learning system, according to some embodiments.

Referring now to FIG. 2, a block diagram illustrating an example incremental learning system 200 is depicted, according to some embodiments. As discussed herein, incremental learning may be used to continuously update and train a machine learning model when new data is received, in some embodiments. As depicted in FIG. 2, incremental learning system 200 includes a client system 210 and a machine learning model 220. In some instances, the client system 210 is part of a separate system that is connected to the machine learning module 220. In some instances, the client system 210 and the machine learning module 220 are part of the same system. The client system 210 may have some data (i.e., input data) that they may want analyzed via machine learning. For example, the client system 210 may have healthcare data for a patient and/or patients to be analyzed to determine whether there are any abnormalities or problems with the patient's health. This data may be transmitted as input data to machine learning module 220 to be inputted into a machine learning model.

Machine learning module 220 includes an incremental learning module 222, a transpose module 224, a simulated data module 226, and a verification module 228. The incremental learning module may house the various incremental machine learning models and may have the capabilities to perform machine learning using these models. In some embodiments, incremental learning module 222 may perform at least operations 110, 120, and 125 of FIG. 1. For example, continuing the healthcare input data above, the incremental learning module 222 may receive the healthcare input data from the client system 210 and may determine whether the previous training data for the necessary machine learning model is still accessible. If the training data is still accessible, the incremental learning module 222 may input the healthcare input data into the necessary machine learning model and may generate an output. However, if the training data is no longer accessible, the incremental learning module 222 may transmit the necessary machine learning module (and any accessible data relating to the model) to the transpose module 224. The transpose module 224 may transpose, or reverse, the old machine learning module into a reverse form of the machine learning module.

In some embodiments, the reverse form of the machine learning module may be transmitted to the simulated data module 226. Simulated data module 226 may perform at least operation 130 of FIG. 1, in some embodiments. Continuing the previous healthcare data example, simulated data module 226 may generate simulated training data using the reverse form of the healthcare machine learning model that no longer has accessible training data. In some instances, the simulated training data may be transmitted to the verification module 228, and the verification module may perform at least operations 140 and 150 of FIG. 1. In some embodiments, once the simulated training data is verified, it may be transmitted back to the incremental learning module 222. The incremental learning module 222 may then perform at least operations 160 and 170 of FIG. 1. Again, returning to the healthcare example, the incremental learning module 222 may generate a new machine learning model for the healthcare data using the simulated training data. The originally received healthcare input data may be used as further training data for the new machine learning model. The new machine learning model may generate an output for the original healthcare input data, in some instances, and may transmit this output data back to the client system 210.

Figure 3:
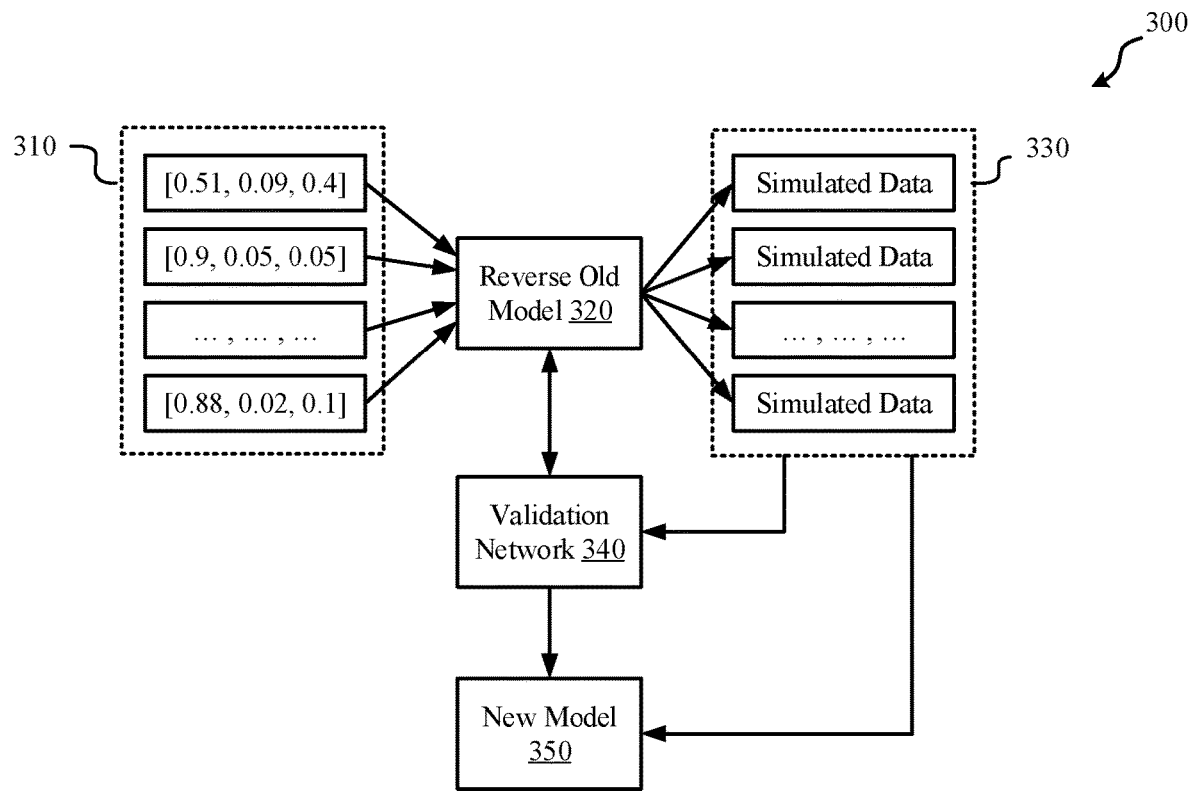
FIG. 3 depicts a schematic diagram of an example construction of a new model, according to some embodiments.

Referring to FIG. 3, a schematic diagram of an example construction 300 of a new model is depicted, according to some embodiments. In this example, a plurality of probability vectors 310 were generated (for example, using softmax distribution). These probability vectors may each be inputted into a reverse old model 320. The probability vectors 310 inputted into the reverse old model 320 may generate a plurality of simulated data 330. In some embodiments, each probability vector 310 may generate a vector of simulated data 330. The plurality of simulated data 330 may make up the simulated training data set, in some instances. Once the simulated data 330 has been created using the reverse old model 320, the simulated data 330 may be verified through the validation network 340 to make sure the simulated data 330 is consistent with the original old model. Once the simulated data 330 has been verified, the simulated data 330 may be used to create a new machine learning model 350. As discussed herein, a preliminary new model (not depicted) may have been created in order to verify the simulated data through the validation network 340. Therefore, in some instances, the new model 350 may be the preliminary new model after it has been verified through the validation network. This new machine learning model 350 may have the capabilities to be further updated and trained (for instance, through incremental learning).

Figure 4:
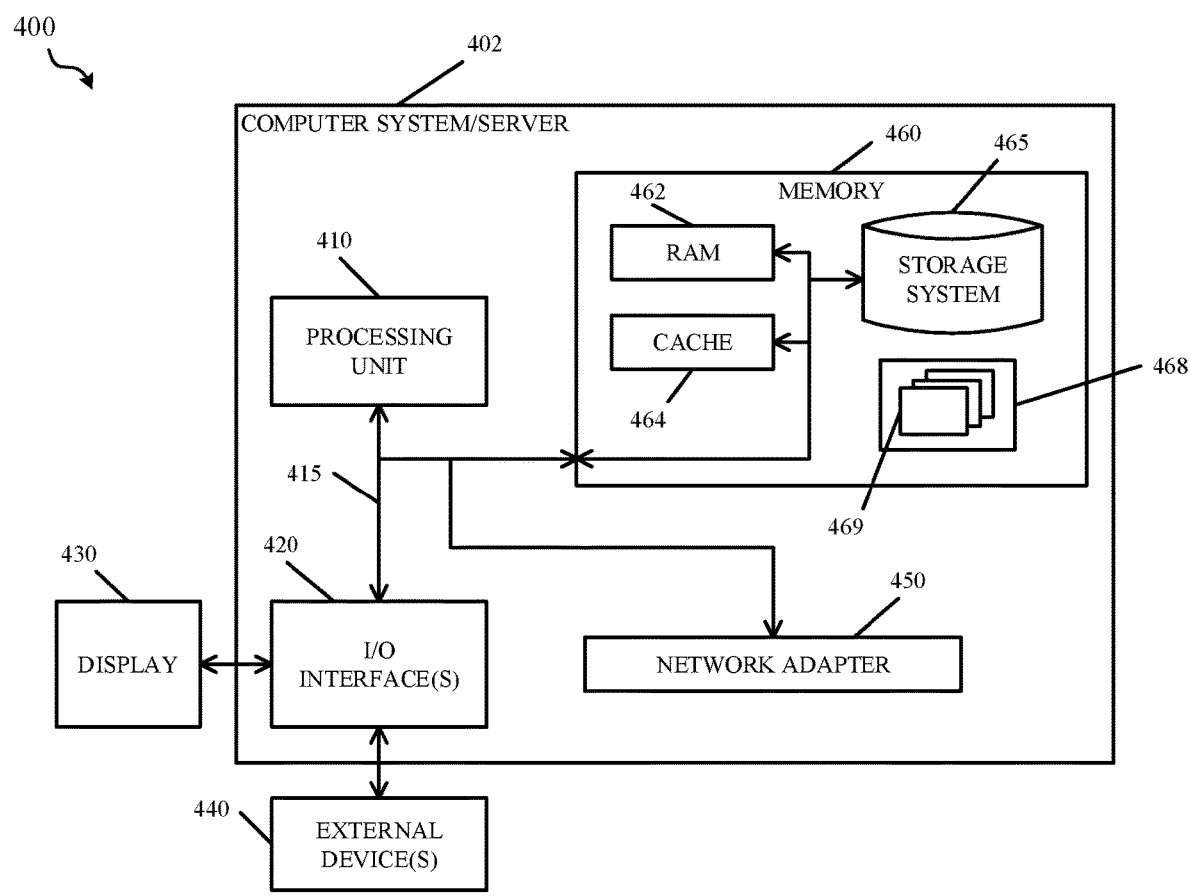
FIG. 4 depicts a block diagram of an example computer system environment, according to some embodiments.

Referring to FIG. 4, computer system 400 is a computer system/server 402 is shown in the form of a general-purpose computing device, according to some embodiments. In some embodiments, computer system/server 402 is located on the linking device. In some embodiments, computer system 402 is connected to the linking device. The components of computer system/server 402 may include, but are not limited to, one or more processors or processing units 410, a system memory 460, and a bus 415 that couples various system components including system memory 460 to processor 410.

Bus 415 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media.

System memory 460 can include computer system readable media in the form of volatile memory, such as random-access memory (RAM) 462 and/or cache memory 464. Computer system/server 402 may further include other removable/non-removable, volatile/non-volatile computer system storage media. By way of example only, storage system 465 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 415 by one or more data media interfaces. As will be further depicted and described below, memory 460 may include at least one program product having a set (e.g., at least one) of program modules that are configured to carry out the functions of embodiments of the disclosure.

Program/utility 468, having a set (at least one) of program modules 469, may be stored in memory 460 by way of example, and not limitation, as well as an operating system, one or more application programs, other program modules, and program data. Each of the operating system, one or more application programs, other program modules, and program data or some combination thereof, may include an implementation of a networking environment. Program modules 469 generally carry out the functions and/or methodologies of embodiments of the invention as described herein.

Computer system/server 402 may also communicate with one or more external devices 440 such as a keyboard, a pointing device, a display 430, etc.; one or more devices that enable a user to interact with computer system/server 402; and/or any devices (e.g., network card, modem, etc.) that enable computer system/server 402 to communicate with one or more other computing devices. Such communication can occur via Input/Output (I/O) interfaces 420. Still yet, computer system/server 402 can communicate with one or more networks such as a local area network (LAN), a general wide area network (WAN), and/or a public network (e.g., the Internet) via network adapter 450. As depicted, network adapter 450 communicates with the other components of computer system/server 402 via bus 415. It should be understood that although not shown, other hardware and/or software components could be used in conjunction with computer system/server 402. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving new data to be inputted into a previously trained machine learning model, wherein training data for the previously trained machine learning model is inaccessible;
   creating a reverse form of the previously trained machine learning model, wherein the creating comprises:
      removing parameters of the previously trained machine learning model, and
      transposing operators of the previously trained machine learning model;
   generating simulated training data using the reverse form of the previously trained machine learning model and a plurality of probability vectors;
   creating a new machine learning model using the simulated training data to train the new machine learning model; and
   inputting the new data as training data into the new machine learning model, wherein the new machine learning model is further trained with the new data.

2. The method of claim 1, wherein the generating the simulated training data comprises:
   inputting the plurality of the probability vectors into the reverse form of the previously trained machine learning model.

3. The method of claim 2, wherein an output from the inputting the plurality of the probability vectors into the reverse form of the previously trained machine learning model comprises a vector equal to a size of an embedded layer of the previously trained machine learning model.

4. The method of claim 2, wherein the simulated training data comprises a plurality of simulated data, wherein each simulated data output corresponds to a probability vector input of the plurality of probability vectors.

5. The method of claim 1, further comprising verifying the simulated training data, wherein verifying the simulated training data comprises:
   determining that the simulated training data can train a model similar to the previously trained machine learning model such that a vector distribution of the simulated training data is consistent with a vector distribution of the inaccessible training data.

6. The method of claim 5, wherein creating the new machine learning model comprises:
   selecting the model similar to the previously trained machine learning model as the new machine learning model.

7. The method of claim 5, wherein inputting the new data into the new machine learning model is in response to the verifying the simulated training data, and wherein inputting the new data into the new machine learning model comprises:
   mixing the new data with the simulated training data to form new training data.

8. The method of claim 7, wherein the creating the new machine learning model and the inputting the new data into the new machine learning model are executed in one batch.

9. The method of claim 5, wherein verifying the simulated training data comprises:
   constructing a forward machine learning model from the simulated training data;
   comparing the forward machine learning model to the previously trained machine learning model; and
   determining, based on the comparing, whether the forward machine learning model meets a similarity threshold to the previously trained machine learning model.

10. The method of claim 9, further comprising:
    determining that the forward machine learning model does not meet the similarity threshold;
    analyzing the simulated training data for outlier simulated training data; and
    removing the outlier simulated training data.

11. The method of claim 1, wherein the new data is inputted into the new machine learning model for incremental learning.

12. A system having one or more computer processors, the system configured to:
    receive new data to be inputted into a previously trained machine learning model, wherein the previously trained machine learning model has inaccessible training data;
    create a reverse form of the previously trained machine learning model, wherein the creating comprises:
       removing parameters of the previously trained machine learning model, and
       transposing operators of the previously trained machine learning model;
    generate simulated training data using tie reverse form of the previously trained machine learning model and a plurality of probability vectors;
    verify the simulated training data;
    create a new machine learning model using the simulated training data, wherein the new machine learning model comprises a same structure as the previously trained machine learning model; and
    input the new data as training data into the new machine learning model, wherein the new machine learning model is further trained with the new data.

13. The system of claim 12, wherein generating the simulated training data using the reverse form of the previously trained machine learning model comprises: generating the plurality of probability vectors for the previously trained machine learning model; and inputting the plurality of the probability vectors into the reverse form of the previously trained machine learning model.

14. The system of claim 12, wherein verifying the simulated training data comprises:
  determining that the simulated training data can train a model similar to the previously trained machine learning model such that a vector distribution of the simulated training data is consistent with a vector distribution of the inaccessible training data.

15. The system of claim 14, wherein inputting the new data into the new machine learning model is in response to the verifying the simulated training data, and wherein inputting the new data into the new machine learning model comprises:
  mixing the new data with the simulated training data to form new training data.

16. The system of claim 12, wherein verifying the simulated training data comprises:
  constructing a forward machine learning model from the simulated training data;
  comparing the forward machine learning model to the previously trained machine learning model; and
  determining, based on the comparing, whether the forward machine learning model meets a similarity threshold to the previously trained machine learning model.

17. A computer program product comprising a computer readable storage medium having program instructions embodied therewith, the program instructions executable by a server to cause the server to perform a method, the method comprising:
  receiving new data to be inputted into a previously trained machine learning model, wherein the previously trained machine learning model has inaccessible training data;
  creating a reverse form of the previously trained machine learning model, wherein the creating comprises:
    removing parameters of the previously trained machine learning model, and
    transposing operators of the previously trained machine learning model;
  generating simulated training data using the reverse form of the previously trained machine learning model and a plurality of probability vectors;
  verifying the simulated training data;
  creating a new machine learning model using the simulated training data, wherein the new machine learning model comprises a same structure as the previously trained machine learning model; and
  inputting the new data as training data into the new machine learning model, wherein the new machine learning model is further trained with the new data.

18. The computer program product of claim 17, wherein generating the simulated training data using the reverse form of the previously trained machine learning model comprises:
  generating the plurality of probability vectors for the previously trained machine learning model; and inputting the plurality of the probability vectors into the reverse form of the previously trained machine learning model.

19. The computer program product of claim 17, wherein verifying the simulated training data comprises:
  determining that the simulated training data can train a model similar to the previously trained machine learning model such that a vector distribution of the simulated training data is consistent with a vector distribution of the inaccessible training data.

20. The computer program product of claim 17, wherein verifying the simulated training data comprises:
  constructing a forward machine learning model from the simulated training data;
  comparing the forward machine learning model to the previously trained machine learning model; and
  determining, based on the comparing, whether the forward machine learning model meets a similarity threshold to the previously trained machine learning model.

* * * * *